US006794053B2

(12) United States Patent
Quintin et al.

(10) Patent No.: US 6,794,053 B2
(45) Date of Patent: Sep. 21, 2004

(54) MULTI-LAYER FILM STRUCTURE FOR USE WITH A HIGH-SPEED POUCH FORMING, FILLING AND SEALING MACHINE

(75) Inventors: Yves Quintin, Saint Bruno (CA); Roland Basque, Brossard (CA); Andre Pitre, Varennes (CA)

(73) Assignee: Glopak Inc., Montreal (CA)

( * ) Notice: Subject to any disclaimer, the term of this patent is extended or adjusted under 35 U.S.C. 154(b) by 0 days.

(21) Appl. No.: 10/202,114

(22) Filed: Jul. 24, 2002

(65) Prior Publication Data

US 2003/0049479 A1 Mar. 13, 2003

Related U.S. Application Data

(60) Division of application No. 09/313,112, filed on May 17, 1999, now Pat. No. 6,237,308, which is a continuation-in-part of application No. 09/832,481, filed on Apr. 11, 2001, now abandoned.

(51) Int. Cl.[7] .............................................. B32B 27/32
(52) U.S. Cl. .................................... 428/516; 264/173.3
(58) Field of Search ...................... 428/516; 264/173.14

(56) References Cited

U.S. PATENT DOCUMENTS

| 5,360,648 | A |  | 11/1994 | Falla et al. ................. 383/109 |
| 5,721,025 | A |  | 2/1998 | Falla et al. ................. 156/145 |
| 5,888,636 | A | * | 3/1999 | Asanuma et al. ........... 428/213 |
| 5,911,665 | A |  | 6/1999 | Heydarpour ................. 53/172 |
| 6,094,889 | A |  | 8/2000 | Van Loon .................... 53/450 |
| 6,231,936 | B1 | * | 5/2001 | Kozimor et al. ........... 428/34.7 |
| 6,237,308 | B1 | * | 5/2001 | Quintin et al. .............. 53/451 |
| 6,270,867 | B1 | * | 8/2001 | Eckstein et al. ........... 428/35.7 |
| 6,294,210 | B1 |  | 9/2001 | Kuo ........................ 206/213.1 |
| 6,437,064 | B1 | * | 8/2002 | Eckstein et al. ............ 526/160 |
| 6,511,568 | B1 | * | 1/2003 | Eckstein et al. ............ 156/216 |
| 6,514,625 | B1 | * | 2/2003 | DeMeuse .................... 428/516 |
| 6,544,660 | B1 | * | 4/2003 | Lind et al. .................. 428/516 |
| 2002/0009579 | A1 | * | 1/2002 | Quintin et al. .............. 428/213 |
| 2003/0049479 | A1 | * | 3/2003 | Quintin et al. .............. 428/523 |

FOREIGN PATENT DOCUMENTS

| WO | WO 97/44178 | 11/1997 |
| WO | WO 98/37140 | 8/1998 |

* cited by examiner

*Primary Examiner*—D. Lawrence Tarazano
(74) *Attorney, Agent, or Firm*—Carter, Schnedler & Monteith

(57) ABSTRACT

The multi-layer film structure having an inner sealing layer which comprises metallocene catalyzed resin, a core which includes polypropylene copolymer and an outer layer and wherein the multi-layer film structure has a thickness within a range between about 50 and 70 microns. By utilizing this thin film with specific properties the sealers may be operated at lower temperatures thereby resulting in an energy saving and they produce seals having improved seal strength of 30% to 50% as compared with known prior mono-layer polyethylene film. The seal initiation temperature is reduced by 10° C. to 15° C. and the film exhibits an improved machine direction tensile strength of 25% to 40% and an improvement of 30% to 50% in puncture resistance as compared with a 76 microns mono-layer polyethylene film. This results in a reduction in the sealing cycle time and an increase in the throughput of the machine. This results in a liquid pouch having a substantial improvement in drop test performance, puncture resistance and seal strength. The machine accomplishes better seals with less energy, requires less downtime for roll changes and maintenance and increase throughput.

17 Claims, 2 Drawing Sheets

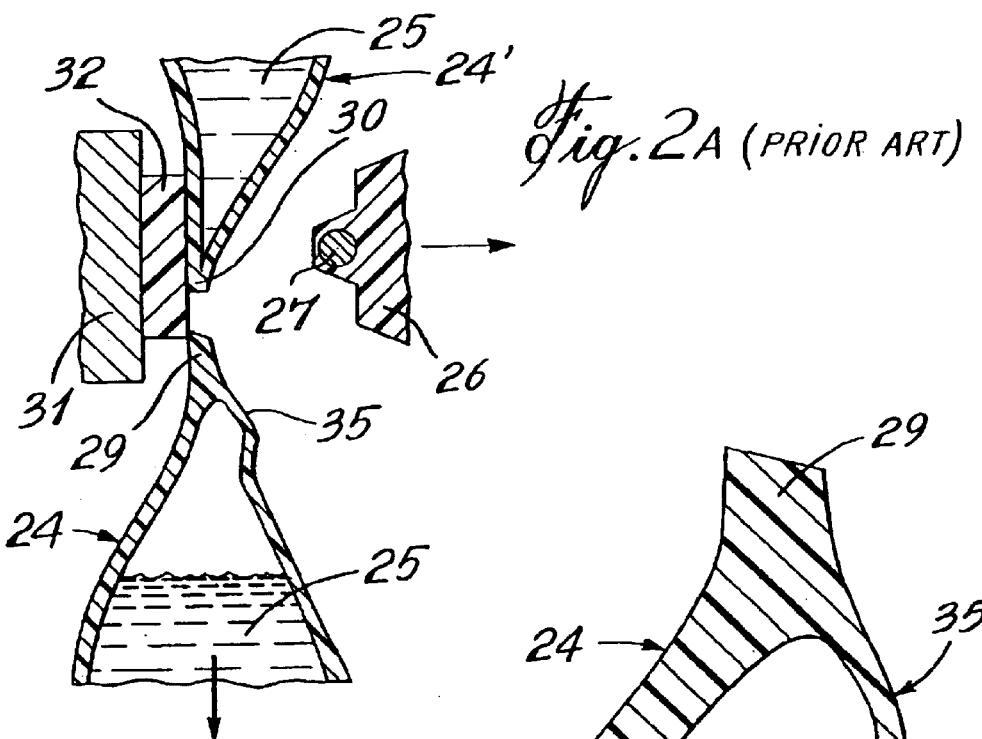
Fig. 2A (PRIOR ART)
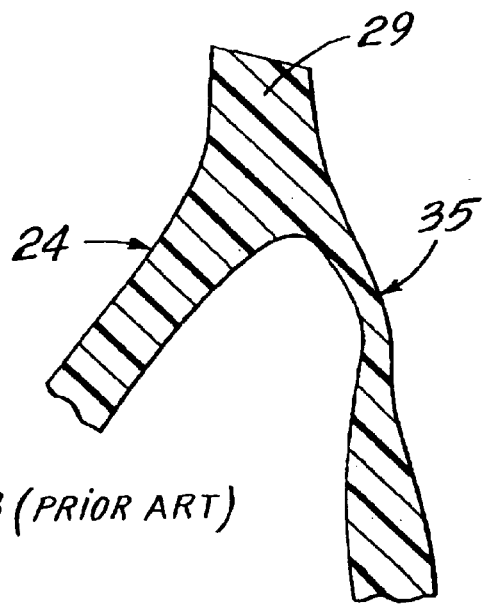
Fig. 2B (PRIOR ART)
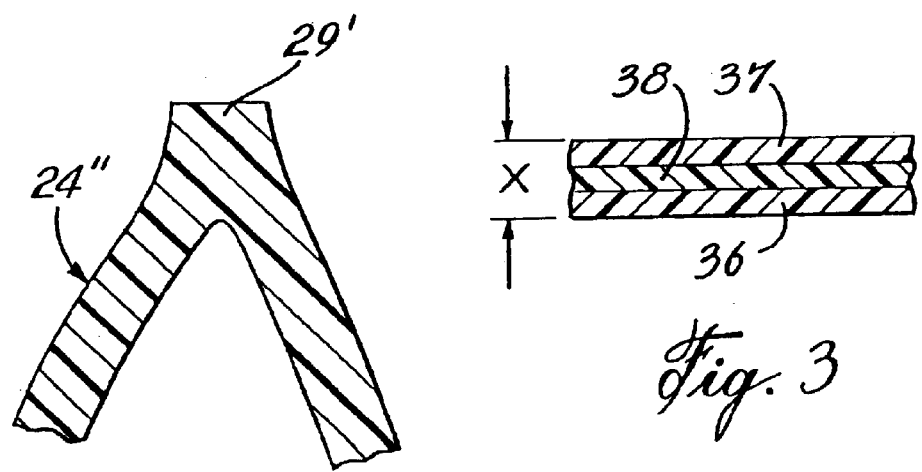
Fig. 4
Fig. 3

MULTI-LAYER FILM STRUCTURE FOR USE WITH A HIGH-SPEED POUCH FORMING, FILLING AND SEALING MACHINE

CROSS-REFERENCE TO RELATED APPLICATION

This application is a divisional of application Ser. No. 09/313,112, filed May 17, 1999 now U.S. Pat. No. 6,237,308 and a continuation-in-part of application Ser. No. 09/832,481 filed Apr. 11, 2001, now abandoned.

TECHNICAL FIELD

The present invention relates to a multi-layer film structure comprised of an inner sealing layer, an outer layer and a core sandwiched between the sealing layer and the outer layer, and wherein the film structure is particularly for use in a high-speed pouch forming, filling and sealing machine.

BACKGROUND ART

Traditionally, in North America, the film used for packaging fluid milk or the like in flexible plastic pouches consists of a 76 microns mono-layer polyethylene film.

However, this standard film has some disadvantages which should be overcome. For example, the packaging operation requires a certain amount of electrical energy for the heat sealing operation due to the thickness of the film. To generate this heat electrical energy is dispensed. It is desirable to develop a process which could decrease the energy consumption in order to make the operation more economically feasible. Another problem involved with the sealing operation is that some of the hardware, such as the sealing element per se and the rubber and Teflon™ parts associated with the sealing jaws have a relatively short useful life, requiring frequent changes and again increasing the cost of producing milk pouches.

Yet another problem resulting from the packaging of liquids with a mono-layer polyethylene film is the amount of waste and machine downtime due to film roll changes and seal breaks. Packaging milk or other liquids with mono-layer polyethylene also involves the use of a narrow sealing window which renders the operation somewhat difficult. Finally, the seals obtained with this type of film pouches, often exhibits weakness which can cause fluid leakage.

Polymer film pouches made from a polyethylene film structure and used for packaging flowable materials such as milk, are known and examples of such are described in U.S. Pat. Nos. 5,288,531; 5,360,648; 5,364,486 and 5,508,051, all of which have issued to the Dow Chemical Company.

SUMMARY OF INVENTION

It is a feature of the present invention to provide a thinner multi-layer co-extruded film structure, which overcomes some or all of the disadvantages of the prior art and incorporated in a bag forming, sealing and filling machine to improve on its method of operation and throughput.

It is another feature of the present invention to provide fluid containing pouches that exhibit desirable properties as compared to the pouches of the prior art.

It is another feature of the invention to provide a multi-layer film structure which makes it possible to reduce the material used as compared to the film of the prior art.

It is another feature of the present invention to provide a multi-layer film structure for packaging liquid that can be sealed at much lower seal initiation temperature.

It is another feature of the present invention to provide a multi-layer film structure for packaging liquid that has a greater machine direction tensile strength.

It is another feature of the present invention to provide a pouch made with the multi-layer film structure according to the invention that is improved in horizontal seal strength, exhibits lower horizontal seal thinning, and minimizes post consumer waste.

It is yet another feature of the present invention to provide a lower gauge pouch having a higher stiffness enabling pouring of liquid, and which exhibits a substantial improvement in drop test performance and puncture resistance.

It is another feature of the present invention to provide a multi-layer film structure for packaging liquid into pouches, which ensures a reduction of the electrical energy required for sealing due to lower heat initiation temperature and lower mass to be sealed.

It is another feature of the present invention to provide a multi-layer film structure for packaging consumable liquid products into pouches which uses lower sealing temperature and thereby improves the useful life of the jaw sealers, such as the rubber, and electrical sealing heads, and resulting in overall energy reduction.

It is another feature of the present invention to provide a multi-layer film structure for packaging dairy products into pouches that permits a substantial reduction of wastes and downtime caused by film roll changes.

It is another feature of the present invention to provide a multi-layer film structure for packaging liquid wherein sealing is easier to operate due to a wider sealing window, and speed increase is made possible as a result of a faster sealing cycle.

According to another feature of the present invention there is provided a high-speed pouch forming, sealing and filling machine and its method of operation and utilizing sealing heads which operate at lower temperatures due to a decrease in the film thickness as compared with 76 microns mono-layer polyethylene film and thereby resulting in an electrical energy saving and wherein the thin film permits the machine to obtain a substantially higher yield with a film roll substantially the same size as with the 76 microns film.

According to the above features, from a broad aspect, the present invention provides a multi-layer structure for use in packaging consumable liquid into flexible pouches comprising an inner sealing layer, an outer layer, and a core sandwiched between said sealing layer and said outer layer, wherein the sealing layer comprises about 70 to 95 weight percent of a metallocene catalyzed resin having a density of between about 0.902 and 0.912, and about 0 to 60 weight percent of a low density polyethylene or a mixture of low density polyethylene and linear low density polyethylene, the outer layer comprises a low density polyethylene or a mixture of low density polyethylene and linear low density polyethylene, the core comprising a mixture of about 10 to 90 weight percent of a polypropylene copolymer and about 10 to 90 weight percent of a low density polyethylene or a mixture of low density polyethylene and linear low density polyethylene, said multi-layer structure having a thickness within a range between about 50 and 70 microns. The metallocene catalyzed resin is m-polyethylene.

According to a still further broad aspect of the present invention there is provided a high-speed pouch forming, sealing and filling machine which comprises means to draw a multi-layer film from a film roll over a pouch-former to form a plastic film tube having an overlap vertical film edge. A vertical sealer is provided and has a sealing head for heat fusing the overlap vertical film edge to form a vertical seal. A filler tube extends into the plastic film tube for injecting a consumable liquid product at a filling location of the plastic film tube. A horizontal sealing jaw, having an electrical thermal sealing element, is provided for effecting a horizontal seal across the plastic film tube and spaced below the filling location and for simultaneously severing the tube to form a top transverse seal for a filled pouch and a bottom transverse seal for a pouch being filled. The multi-layer film has an inner sealing layer, an outer layer and a core sandwiched therebetween. The characteristics of this film are described above. The horizontal and vertical seals have an improved seal strength of 30% to 50% as compared with the 76 microns mono-layer polyethylene film and a 10° C. to 15° C. reduction in seal initiation temperature, an improved machine direction tensile strength of 25% to 40% and an improvement of 30% to 50% in puncture resistance, while reducing the sealing cycle time and increasing the throughput of the machine.

BRIEF DESCRIPTION OF THE DRAWINGS

The preferred embodiments of the present invention will now be described with reference to the accompanying drawings in which:

FIG. 2a is an enlarged fragmented and partly sectioned view showing the horizontal sealing jaws of a prior art machine and the defect of seal thinning that occurs when using conventional 76 microns mono-layer polyethylene film;

FIG. 2b is an enlarged sectional view of the horizontal seal of the pouch illustrated in FIG. 2a which better illustrates seal thinning;

FIG. 3 is a sectional view illustrating the three-layer film of the present invention; and FIG. 4 is an enlarged fragmented sectional view showing a top horizontal seal formed on a pouch and using the three-layer film of the present invention and wherein film thinning is eliminated.

DESCRIPTION OF PREFERRED EMBODIMENTS

Figure 1:
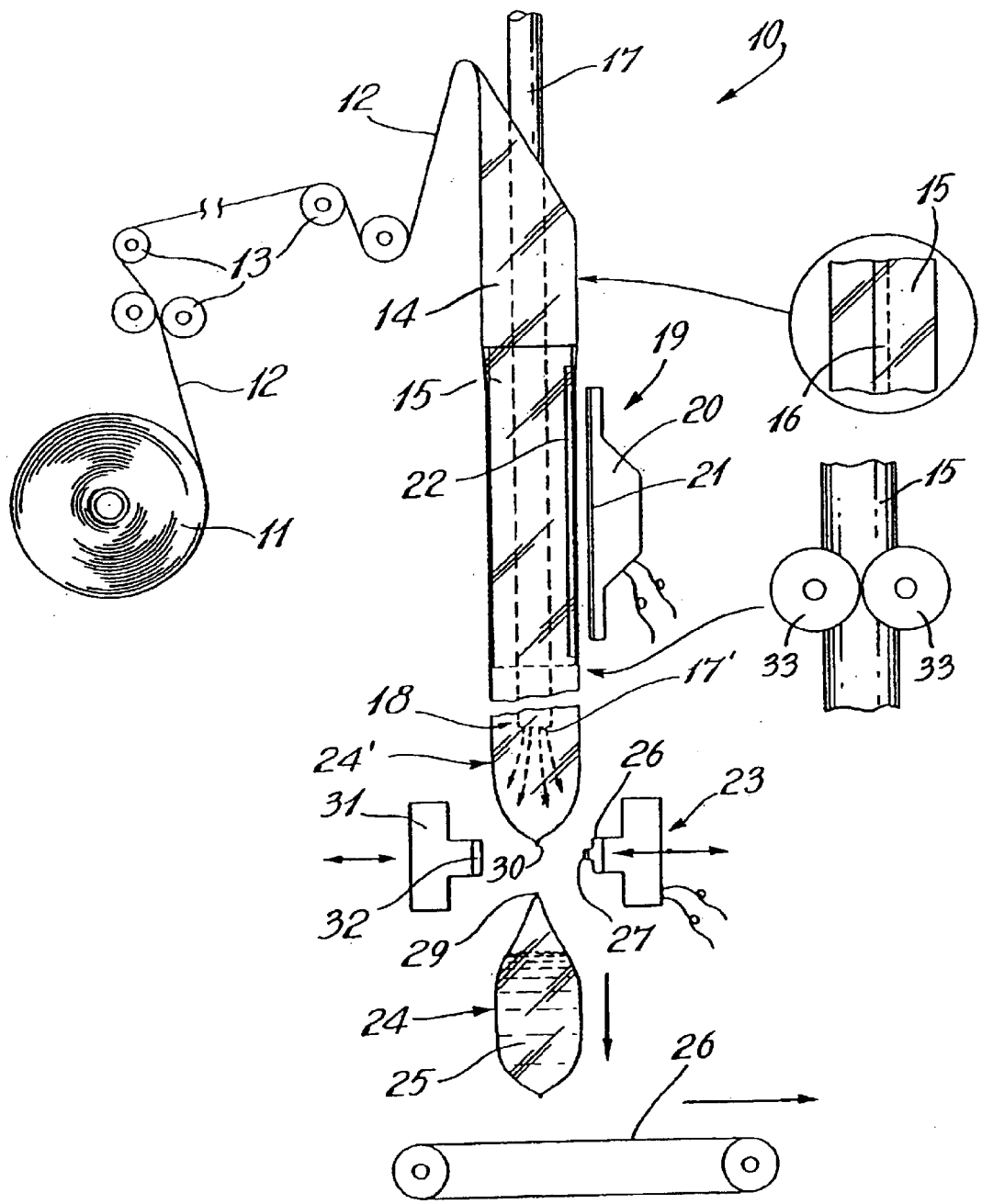
FIG. 1 is a schematic diagram illustrating basic component parts of the improved high-speed pouch forming, sealing and filling machine of the present invention.

Referring now to the drawings and more particularly to FIG. 1 there is shown generally at 10 basic component parts of a high-speed bag forming, sealing and filling machine constructed in accordance with the present invention. These basic component parts are only schematically illustrated and are well known in the art. The improvement in the machine resides primarily in the vertical sealer operating characteristics and the horizontal sealing jaws characteristics, as will be described later. The sealers are controlled to operate with a new multi-layer film whereby to increase the throughput of the machine and provide filled pouches having improved strength and wherein the seals are greatly improved over those of the prior art thereby resulting in a machine which can output more filled pouches, achieve a significant waste reduction and less downtime as compared with prior art machines using a 76 microns mono-layer polyethylene film. As hereinshown the high-speed pouch forming, sealing and filling machine comprises a film roll 11 provided with a multi-layer film 12 which is guided through guide rolls and tensor rolls 13 to a top end of a pouch former 14 where the plastic film is guided and folded to form a plastic film tube 15 having an overlap vertical film edge 16. A filler tube 17 extends within the pouch former 14 and the tube 15 and has a liquid discharge end 17' positioned at a filling location 18.

A vertical sealer 19 has a sealing head 20 provided with a heating element 21 and a backing member 22 is disposed vertically aligned behind the overlap vertical film edge 16. A vertical seal is formed by fusing the overlapped edge 16 along the plastic tube 15 above the filling location 18. A horizontal sealing jaw assembly 23 is provided spaced at a predetermined distance below the filling location 18 whereby to form a horizontal seal across the film tube 18 and at the same time sever the tube to form a sealed pouch 24 filled with a consumable liquid 25 therein. The pouch is then released on a discharge conveyor means 26.

The horizontal sealing jaw assembly 23 is comprised of a sealing head 27 provided with an electrical impulse sealing wire element 28 to sever the film tube as well as to form a top horizontal seal 29 for the pouch 24 and a bottom horizontal seal 30 for the next pouch being formed herein illustrated by reference numeral 24'. The horizontal sealing jaw assembly 23 also has a backing member 31 which is provided as a rubber or Teflon™ pad 32 to serve as a backing for the electrical impulse sealing wire element 27. From time-to-time it is necessary to change the pad and the wire element as they wear down. By operating at lower temperature, 10° C.–15° C. lower than the prior art discussed above, these elements have a longer life cycle and there is less machine stoppages. The jaw assembly 23 may move in and out in unison to form the seal or the backing member 31 may be stationary and positioned close to the film with only the sealing head 26 moving in and out. Other suitable sealing assemblies are conceivable provided they can achieve the same results. The film sheet 12 is drawn in continuous motion by a pair of draw rolls 33 in a manner well known in the art. So far we have described the basic component parts of a well known pouch forming, sealing and filling machine such as the Thimonnier M3200™ or a Prepak IS-7™.

The present invention resides in the provision of a novel multi-layer film structure in combination with the machine to enhance the performance of the machine. This enhancement is achieved by controlling the temperature of the sealing assemblies 19 and 23 wherein they operate at temperatures which are lower than prior art machines. The draw rolls 33 are also operated at higher speeds whereby to increase the throughput of the machine while producing horizontal seals which are much superior than the above-mentioned prior art machines and resulting in a production having less post consumer waste and permitting the machine to operate with less downtime previously caused by malfunction or plastic film roll change.

In particular the high-speed bag forming, sealing and filling machine as above described is utilized for the production of milk pouches and such machines conventionally use a 76 microns mono-layer polyethylene film which heretofore was the best film product available for this use. FIGS. 2a and 2b illustrate one of the more serious problems that these machines have been plagued with in the production of such pouches and namely the formation of seal thinning. As shown in FIG. 2a the pouch 24 has just been formed with the horizontal seal 29 severed and the filled pouch 24 is being discharged under the influence of its own weight. As the seal is formed the weight of the liquid 25 within the pouch 24 exerts a load on the horizontal seal and this causes seal thinning in the region 35. Seal thinning is caused by the stretching of the polyethylene in the area of the seal which causes the film to thin out in this region. FIG.

2b better illustrates the seal thinning area 35 and as hereinshown this produces a weakness in the pouch 24 in this thinner stretched area of the seal. As the pouch is dropped on the discharge conveyor 26 it is subject to impact which could burst the film in the seal thin region 35. Furthermore, as these pouches are handled by consumers or during packaging pressures applied against the liquid 25 within the pouch exerts a force on the thin film region 35 which again could cause leakage. Weak seals caused by seal thinning has long existed and no adequate solution has been found to date to improve these machines and the film in order to substantially overcome the above-mentioned problems. We have now discovered that by producing a film which can substantially eliminate seal thinning and improve on machine performance that a superior pouch can be produced at a higher machine throughput and at a lower cost by substantially eliminating the above production problems.

In a preferred embodiment the multi-layer film of the present invention is a three-layer film as schematically illustrated in FIG. 3. The three-layer film has an inner sealing layer 36, an outer layer 37 and a core layer 38 sandwiched therebetween. The core may be of one of several layers of polymers.

Seal thinning is substantially eliminated by the combination of the m-polyethylene sealing layer and a core incorporating a higher melting point polypropylene.

According to preferred embodiments, the sealing layer 36 represents about 10 to 30 weight percent of the structure, the core 38 represents about 30 to 70 weight percent of the structure, and the outer layer 37 represents about 10 to 30 weight percent of the structure.

Preferably, the sealing layer 36 is a metallocene catalyzed resin having a density within a range between about 0.902 and 0.905 g/cc, but may have a density in the range between about 0.902 and 0.912 g/cc and the thickness "x" of the multi-layer structure is preferably about 65 microns.

In accordance with another embodiment, the multi-layer structure has an inner layer 36 having a seal initiation temperature between about 80° and 90° C.

The metallocene catalyzed resin preferably consists of m-polyethylene. For example, the sealing layer may comprise between about 70 and 95 weight percent metallocene polyethylene, more specifically between about 75 and 85 weight percent metallocene polyethylene.

The preferred copolymer to be used in the core 38 consists of high impact polypropylene copolymer having a melting point differential with the m-polyethylene of at least 40° C.

The invention also relates to a process for preparing the multi-layer structure by providing a sealing composition comprising about 40 to 100 weight percent of a metallocene catalyzed resin having a density between about 0.902 and 0.912 g/cc, and about 0 to 60 weight percent of a low density polyethylene or a mixture of low density polyethylene and linear low density polyethylene, an outer layer composition comprising a low density polyethylene or a mixture of low density polyethylene and linear low density polyethylene, and a core composition comprising a mixture of about 10 to 90 weight percent of a polypropylene copolymer and about 10 to 90 weight percent of a low density polyethylene or a mixture of low density polyethylene and linear low density polyethylene, simultaneously co-extruding in a blown or cast co-extrusion line, the sealing composition, the outer layer composition and the core composition, and feeding the co-extruded compositions to a die under conditions to provide a thickness between about 50 and 70 microns.

When compared to the traditional 76 microns mono-layer film, the advantages of the film according to the invention when used in vertical form, fill & seal machine, such as shown in FIG. 1, for a liquid pouch application are as follows:

Film:
a minimum of 25% improvement in yield (sq. inch per lbs)

a 10° C. to 15° C. lower seal initiation temperature

25% to 40% greater machine direction tensile strength (Psi)

30% to 50% improvement in puncture resistance (lbs/mil)

Pouch:
a 30% to 50% improvement in horizontal seal strength (lb/inch)

a reduction of horizontal seal thinning from more than 20% to less than 3% (typical seal thinning is greater than 20% for mono-layer films in this application)

a minimum of 25% post consumer waste reduction an improvement of 30% to 50% in stiffness, (% modulus in Psi) which enables pouring of liquid at a lower gauge a two to threefold improvement in drop test performance Pouch filling and sealing application
a 20% to 40% reduction of energy required for sealing due to the lower heat initiation temperature and the lower mass (33% less) to seal through an improvement in the useful life of consumable items proportional to the energy reduction (rubber, Teflon™, sealing element)

a minimum of 20% reduction of wastes and downtime caused by film roll changes easier operation due to a wider sealing window increased speed made possible by a faster sealing cycle FIG. 4 illustrates the improvement in the seal of the pouch 24" achieved with the multi-layer film of the present invention. As can be seen seal thinning below the top horizontal seal 29' is eliminated and results in a pouch which is free of seal defects and which exhibits all of the above listed advantages of the pouch as well as the machine. Although the three-layer film of the present invention has been described with particular reference to a pouch forming sealing and thinning machine such as a VFFS machine like a Thimonnier M3200™ or Prepak IS-7™, it is conceivable that this film may have other uses and the present invention is not intended to limit the scope of its use in such machines.

The invention will now be illustrated by means of the following table which is not intended to limit the scope of the invention as defined in the appended claims.

|  | DG 2 | DG 10 | Comp 1 | Comp 2 |
|---|---|---|---|---|
| Thickness (mil) | 2.5 | 2.5 | 3.0 | 3.0 |
| Film yield | 13,400 | 13,400 | 10,200 | 10,200 |
| Seal Initiation Temperature (° C.) | 80 | 80 | 95 | 95 |
| Puncture (peak load in lb) | 22 | 22 | 17 | 16 |
| Horizontal Seal Strength (lb/inch) | 9.4 | 9.1 | 7.0 | 6.8 |
| Seal Thinning | 2.1% | 3.0% | >20% | >20% |
| Stiffness (1% Modulus in lb) | 170 | 170 | 100 | 103 |
| Glopak Drop Test (# of times) | 7–9 | 7–9 | 2–4 | 2–4 |

The above are typical values obtained from representative samples, DG 2 and DG 10 are Glopak experimental multi-layer films. Comp 1 and Comp 2 are competitive mono-layer films used in Canadian dairies.

It is within the ambit of the present invention to cover any obvious modifications which fall within the scope of the appended claims.

We claim:

1. A multi-layer film structure for use in packaging flowable dairy products into flexible pouches comprising an inner sealing layer, an outer layer, and a core sandwiched between said sealing layer and said outer layer, wherein said sealing layer comprises about 70 to 95 weight percent of a metallocene catalyzed resin having a density of between about 0.902 and 0.912 g/cc, and about 0 to 60 weight percent of a low density polyethylene or a mixture of low density polyethylene and linear low density polyethylene; said outer layer comprises a low density polyethylene or a mixture of low density polyethylene and linear low density polyethylene; said core comprising a mixture of about 10 to 90 weight percent of a polypropylene copolymer and about 10 to 90 weight percent of a low density polyethylene or a mixture of low density polyethylene and linear low density polyethylene; said multi-layer film structure having a thickness within a range between about 50 and 70 microns; said metallocene catalyzed resin being m-polyethylene.

2. A multi-layer film structure according to claim 1, wherein said sealing layer represents about 10 to 30 weight percent of said structure.

3. A multi-layer film structure according to claim 1, wherein said core represents about 30 to 70 weight percent of said structure.

4. A multi-layer film structure according to claim 1, wherein said outer layer represents about 10 to 30 weight percent of said structure.

5. A multi-layer film structure according to claim 1, wherein said metallocene catalyzed resin has a density within a range between about 0.902 and 0.905 g/cc.

6. A multi-layer film structure according to claim 1, which has a thickness of about 65 microns.

7. A multi-layer film structure according to claim 1, which has a seal initiation temperature between about 80 and 90° C.

8. A multi-layer film structure according to claim 1, wherein said core comprises high impact polypropylene copolymer.

9. A multi-layer film structure for use in packaging flowable dairy products into flexible pouches comprising an inner sealing layer, an outer layer, and a core sandwiched between said sealing layer and said outer layer, wherein said sealing layer comprises about 70 to 95 weight percent of a metallocene catalyzed resin having a density of between about 0.902 and 0.912 g/cc, and about 0 to 60 weight percent of a low density polyethylene or a mixture of low density polyethylene and linear low density polyethylene; said outer layer comprises a low density polyethylene or a mixture of low density polyethylene and linear low density polyethylene; said core comprising a mixture of about 10 to 90 weight percent of a polypropylene copolymer and about 10 to 90 weight percent of a low density polyethylene or a mixture of low density polyethylene and linear low density polyethylene; said multi-layer film structure having a thickness within a range between about 50 and 70 microns; said metallocene catalyzed resin being m-polyethylene.

10. A multi-layer film structure according to claim 9, wherein said sealing layer represents about 10 to 30 weight percent of said structure.

11. A multi-layer film structure according to claim 9, wherein said core represents about 30 to 70 weight percent of said structure.

12. A multi-layer film structure according to claim 9, wherein said outer layer represents about 10 to 30 weight percent of said structure.

13. A multi-layer film structure according to claim 9, wherein said metallocene catalyzed resin has a density within a range between about 0.902 and 0.905 g/cc.

14. A multi-layer film structure according to claim 9, which has a thickness of about 65 microns.

15. A multi-layer film structure according to claim 9, which has a seal initiation temperature between about 80 and 90° C.

16. A multi-layer film structure according to claim 9, wherein said core comprises high impact polypropylene copolymer.

17. Process for preparing a multi-layer structure according to claim 9, which comprises providing a sealing composition comprising about 70 to 95 weight percent of a metallocene catalyzed resin having a density of between about 0.902 and 0.912 g/cc, and about 0 to 60 weight percent of a low density polyethylene or a mixture of low density polyethylene and linear low density polyethylene; an outer layer composition comprising a low density polyethylene or a mixture of low density polyethylene and linear low density polyethylene; and a core composition comprising a mixture of about 10 to 90 weight percent of a polypropylene copolymer and about 10 to 90 weight percent of a low density polyethylene or a mixture of low density polyethylene and linear low density polyethylene, simultaneously co-extruding in a blown or cast co-extrusion line, said sealing composition and said core composition under conditions to provide a thickness between about 50 and 70 microns.

* * * * *